(12) United States Patent
Geyer et al.

(10) Patent No.: US 11,549,458 B2
(45) Date of Patent: Jan. 10, 2023

(54) METHOD FOR OPERATING A TWO STROKE ENGINE

(71) Applicant: Andreas Stihl AG & Co. KG, Waiblingen (DE)

(72) Inventors: Klaus Geyer, Sulzbach (DE); Johannes Alber, Stuttgart (DE); Johann-Sebastian Renz, Gomaringen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/517,453

(22) Filed: Nov. 2, 2021

(65) Prior Publication Data
US 2022/0136453 A1 May 5, 2022

(30) Foreign Application Priority Data
Nov. 2, 2020 (EP) .................... 20205168

(51) Int. Cl.
*F02D 41/30* (2006.01)
*F02D 41/34* (2006.01)
*F02D 41/20* (2006.01)

(52) U.S. Cl.
CPC ............ *F02D 41/34* (2013.01); *F02D 41/20* (2013.01); *F02D 2041/2055* (2013.01); *F02D 2200/021* (2013.01); *F02D 2200/024* (2013.01); *F02D 2200/0404* (2013.01); *F02D 2200/101* (2013.01); *F02D 2400/04* (2013.01); *F02D 2400/06* (2013.01)

(58) Field of Classification Search
CPC .. F02D 41/34; F02D 41/20; F02D 2041/2055; F02D 2200/021; F02D 2200/024; F02D 2200/0404; F02D 2400/04; F02D 2400/06
USPC ...................................... 123/73 C
See application file for complete search history.

(56) References Cited

U.S. PATENT DOCUMENTS

| | | |
|---|---|---|
| 4,901,701 A | 2/1990 | Chasteen |
| 2006/0156800 A1 | 7/2006 | Geyer |
| 2006/0157006 A1 | 7/2006 | Schieber et al. |
| 2009/0145399 A1 | 6/2009 | Carlsson et al. |
| 2009/0228189 A1 | 9/2009 | Zurcher et al. |
| 2015/0020772 A1 | 1/2015 | Eberle et al. |

FOREIGN PATENT DOCUMENTS

| | | |
|---|---|---|
| DE | 196 28 740 A1 | 1/1998 |
| DE | 10 2005 002 273 A1 | 7/2006 |
| DE | 10 2005 002 275 A1 | 7/2006 |

(Continued)

*Primary Examiner* — Hai H Huynh
(74) *Attorney, Agent, or Firm* — Walter Ottesen, P.A.

(57) ABSTRACT

A method for operating the two stroke engine provides that the fuel valve is controlled after the starting process in at least a quasi-steady state such that, on the basis of uninterruptedly successive blocks of successive revolutions of the crankshaft, the fuel valve is opened and closed exactly once within each block. Each block includes from two to twenty revolutions of the crankshaft. The fuel valve is opened over a crankshaft angle (α) of more than 360° within one block in at least one operating state. A control device is provided for controlling the fuel valve. A quasi-steady state of the two stroke engine is a state in which the throttle element is adjusted by less than 10% of the maximum adjustment of the throttle element over a crankshaft angle (α) of 360°.

15 Claims, 3 Drawing Sheets

(56) References Cited

FOREIGN PATENT DOCUMENTS

| | | |
|---|---|---|
| DE | 10 2008 012 536 A1 | 9/2009 |
| DE | 10 2013 012 135 A1 | 1/2015 |
| WO | 2007/133148 A1 | 11/2007 |

METHOD FOR OPERATING A TWO STROKE ENGINE

CROSS REFERENCE TO RELATED APPLICATION

This application claims priority of European patent application no. 20 205 168.6, filed Nov. 2, 2020, the entire content of which is incorporated herein by reference.

TECHNICAL FIELD

The disclosure relates to a method for operating a two stroke engine.

BACKGROUND

It is known in two stroke engines to use an electromagnetic fuel valve for metering in the fuel required for operation. Here, the fuel is conventionally metered in for each engine cycle. Here, the fuel valve is opened once and closed once within an engine cycle. This results in very short switching times in particular at full load, for example at rated rotational speed or at maximum rotational speed. To be able to realize these, it is necessary to use an electromagnetic valve of very elaborate configuration with a high energy requirement.

In order to avoid these very short switching times at high rotational speeds, it is known from US 2015/0020772 for the fuel valve to be opened during idling operation with a frequency that is coordinated with the opening and closing of the intake channel. Therefore, in idling operation, fuel is supplied synchronously with respect to the engine cycles. At full load, provision is made for the electromagnetic valve to be opened independently of the frequency with which the intake channel is connected to the crankcase interior, that is, independently of the engine cycles. As a result, at full load, the fuel valve does not need to be opened and closed in every engine cycle, but can be opened and closed less frequently, whereby the use of a valve of simpler construction is made possible.

It has been found that the switchover of the operating mode of the fuel valve from operation that is synchronous with the engine cycles to operation that is asynchronous with respect to the engine cycles is perceptible to the operator if the switchover time is selected in an unsuitable manner. This is undesired.

SUMMARY

It is an object of the disclosure to provide a method for operating a two stroke engine, wherein the method is usable for all operating states of the internal combustion engine with the exception of the starting process and allows the use of a valve of simple construction.

The aforementioned object can, for example, be achieved via a method for operating a two stroke engine. The two stroke engine has a cylinder, a piston, and a crankcase, a combustion chamber being formed in the cylinder, the combustion chamber being delimited by the piston which is mounted so as to move in reciprocating fashion in the cylinder, the piston being configured to rotationally drive a crankshaft that is mounted rotatably in the crankcase; the two stroke engine further having an electromagnetic fuel valve, a control device, an intake channel, and a throttle element arranged in the intake channel; the electromagnetic fuel valve being configured to control a fuel quantity (x) fed via at least one outlet nozzle into the intake channel; the control device being configured to control the fuel valve; and, wherein a quasi-steady state of the two stroke engine is a state in which the throttle element is adjusted by less than 10% of the maximum adjustment of the throttle element over a crankshaft angle ($\alpha$) of 360°. The method includes: controlling the fuel valve after a starting process in at least the quasi-steady state of the two stroke engine such that, on a basis of uninterruptedly successive blocks of successive revolutions of the crankshaft, the fuel valve is opened and closed exactly once within each block, each block including 2 to 20 revolutions of the crankshaft, and wherein the fuel valve is opened over a crankshaft angle ($\alpha$) of more than 360° within one block in at least one operating state.

Provision is made according to the disclosure for multiple successive revolutions of the crankshaft to be combined to form a block, and for the control of the fuel valve to be performed, at least in a quasi-steady state of the two stroke engine, on the basis of uninterruptedly successive blocks of revolutions of the crankshaft. At least in the quasi-steady state, the fuel valve is opened exactly once and closed exactly once within each block of revolutions of the crankshaft. Here, each block includes from 2 to 20 revolutions of the crankshaft. The expression "block" describes the joint consideration of multiple crankshaft revolutions in the control device. The block of crankshaft revolutions is considered collectively with regard to the control of the fuel valve in the control device. The fuel valve is controlled not on the basis of individual revolutions of the crankshaft but on the basis of a block of crankshaft revolutions.

By virtue of the fact that each block includes at least two revolutions of the crankshaft and the fuel valve is opened and closed exactly once within the block in at least a quasi-steady state of the two stroke engine, sufficiently long periods of time are available for the control of the fuel valve even at high rotational speeds such as rated rotational speed or maximum rotational speed, such that the use of an electromagnetic fuel valve of relatively simple construction is made possible. By virtue of the fact that the fuel valve is controlled in each case for a block of successive revolutions of the crankshaft both for idling operation and for high rotational speeds, a switchover between control of the electromagnetic valve that is synchronous with the engine cycles and control of the electromagnetic valve that is asynchronous with respect to the engine cycles is avoided. The electromagnetic fuel valve is always controlled synchronously with respect to successive blocks that each include the same number of revolutions of the crankshaft.

Preferably, the fuel valve is controlled after the starting process in all quasi-steady states of the two stroke engine such that, on the basis of uninterruptedly successive blocks of successive revolutions of the crankshaft, the fuel valve is opened and closed exactly once within each block.

It is only during the starting process and during transient states that deviating control of the fuel valve may be advantageous. Since the rotational speeds are relatively low during the starting process, the control of the fuel valve during the starting process is not critical with regard to the required switching time of the electromagnetic valve. The starting process is advantageously performed via a manually operated pull starter. This is actuated by the operator for the purposes of starting.

The rated rotational speed of the two stroke engine may for example be between 9000 revolutions/minute and 12,000 revolutions/minute. The maximum rotational speed of the two stroke engine may for example be between 12,000 revolutions/minute and 17,000 revolutions/minute.

In the present case, quasi-steady states of the two stroke engine are at least all states in which the throttle element is adjusted by less than 10% of the maximum adjustment of the throttle element of a crankshaft angle of 360°. In particular, quasi-steady states of the two stroke engine are all states in which the throttle element is adjusted by less than 20% of the maximum adjustment of the throttle element over a crankshaft angle of 360°. States in which the throttle element is adjusted very quickly, for example acceleration states and deceleration states, are accordingly not quasi-steady states. In the case of fast acceleration and fast deceleration, the fuel demand of the two stroke engine changes abruptly. This may necessitate control of the fuel valve that deviates from the block-based control with exactly one opening and closing of the fuel valve per block.

The maximum adjustment of the throttle element corresponds to the adjustment movement that the throttle element covers between its first end position and its second end position. The throttle element is commonly mounted so as to be pivotable, such that the maximum adjustment travel corresponds to the pivot angle of the throttle element between its end positions.

It is advantageously the case that, in at least one position of the piston, the crankcase interior is fluidically connected to the combustion chamber via at least one transfer channel. The intake channel advantageously issues into the crankcase interior via an intake channel opening, which is controlled by the piston, on the cylinder bore.

It is preferable if, within each block at least in the at least one, in particular at least in all quasi-steady states, the fuel valve is opened at the same crankshaft angle within the block. In particular during idling operation, when the fuel valve has a relatively short opening time, it is possible through suitable selection of the crankshaft angle at which the fuel valve is opened within the block to achieve a coordination with the pressure prevailing in the crankcase interior during the opening period. By virtue of the fact that, within each block, the fuel valve is opened at the same crankshaft angle of the block, only the closing time of the fuel valve has to be specified by the control device, resulting in simple control. The opening of the fuel valve during idling operation is advantageously relatively short, because the two stroke engine requires relatively low fuel quantities during idling operation.

It is advantageous if the fuel valve is opened over a crankshaft angle of more than 360° within one block in at least one operating state. By virtue of the fact that the fuel valve is opened over more than 360°, that is, over more than one complete revolution of the crankshaft, a relatively large fuel quantity can be supplied. This is advantageous in particular at high rotational speeds, for example at full load.

The number of revolutions of the crankshaft per block can advantageously be stored as a constant value in the control device. The number of revolutions of the crankshaft per block is preferably invariable at least for all quasi-steady operating states. The number of revolutions of the crankshaft per block is equal for all quasi-steady operating states. For transient states, the number of revolutions of the crankshaft per block may deviate, in particular if the block-based control of the fuel valve is terminated within a block owing to an acceleration being identified, and a new block is immediately started.

It is advantageous if the control device determines the desired opening duration of the fuel valve on the basis of at least one parameter. The at least one parameter may be dependent on boundary conditions, on power unit conditions and/or on ambient conditions. Power unit conditions may for example be a temperature and/or pressure of the drive engine. Ambient conditions may for example be the ambient pressure or the ambient temperature. Boundary conditions may for example be the degree of contamination of an air filter or the load acting on a tool of a work apparatus that is driven by the two stroke engine.

It is preferable if the non-linear delivery characteristic of the fuel into the intake channel is taken into consideration in the determination of the opening duration of the fuel valve. It has been found that the fuel quantity supplied to the intake channel has a non-linear dependency on the opening duration of the fuel valve. The non-linear delivery characteristic of the fuel into the intake channel is firstly caused by pressure fluctuations at the outlet nozzle at which the fuel passes over into the intake channel. Secondly, it has been found that the fuel column present in the system reacts inertly and, upon the opening of the fuel valve, the fuel column firstly has to be set in motion. Upon the closing of the fuel valve, even if no significant negative pressure is prevailing in the intake channel, it is still possible for fuel to escape into the intake channel owing to the inertia of the fuel column. The closing time of the fuel valve can preferably be determined taking into consideration this non-linear behavior. The fuel is advantageously not subjected to an admission pressure upstream of the fuel opening. The fuel is advantageously not pressurized but delivered out of at least one fuel opening via the negative pressure generated in the intake channel. The fuel valve, in the opened state, allows fuel to be delivered out of the at least one fuel opening via negative pressure.

Provision may be made for the two stroke engine to have a throttle element in the intake channel. Such a throttle element is advantageously provided in order to control the free flow cross section of the intake channel. Provision may be made for the position of the throttle element to be detected via a sensor. In an advantageous configuration, the detected position of the throttle element is a parameter that is used for the determination of the opening duration of the fuel valve.

Alternatively or in addition, a pressure sensor may be provided for detecting the pressure in the crankcase interior and/or for detecting the pressure in the intake channel. The determined pressure is in particular a parameter that is used for the determination of the opening duration of the fuel valve. The pressure may also be used to detect an adjustment of the throttle element. Alternatively, a sensor may be provided for determining the position of the throttle element.

Alternatively or in addition, a temperature sensor may be provided. The determined temperature can advantageously be a parameter that is used for determining the opening duration of the fuel valve. The temperature sensor can advantageously be provided for determining the temperature in the crankcase interior or for determining the temperature of the inducted air in the intake channel. Alternatively, provision may also be made for the temperature sensor to detect a component temperature of the two stroke engine, such as the temperature of the cylinder or of the crankcase. It is also possible for multiple temperature sensors to be provided for determining different temperatures.

The opening duration of the fuel valve is in particular determined on the basis of the rotational speed of the two stroke engine. In a configuration, the opening duration of the fuel valve is determined via a characteristic map. In an alternative configuration, provision may be made for the opening duration of the fuel valve to be calculated.

It is preferable for each block to include from 3 to 12, in particular from 4 to 10, preferably 6, revolutions of the crankshaft. It has been found that, in the case of very small numbers of revolutions of the crankshaft per block, the switching times of the electromagnetic valve have a considerable influence on the opening times and thus on the delivered fuel quantity. In the case of a small number of revolutions of the crankshaft per block, the exact metering of fuel is therefore difficult, or it is necessary to use a relatively high-grade electromagnetic valve. If the number of revolutions of the crankshaft per block is relatively high, in particular greater than 12 revolutions per block, an inhomogeneous mixture can form in the combustion chamber because the crankcase interior and the intake channel are not sufficient for temporarily storing the fuel. This can result in non-uniform operating behavior of the two stroke engine. These disadvantages can be avoided through suitable selection of the number of revolutions of the crankshaft per block.

The control of the fuel valve on the basis of uninterruptedly successive blocks of successive revolutions of the crankshaft may be disadvantageous in the case of acceleration or deceleration, because in the case of acceleration processes, the fuel quantity metered in in the present block may be too low, and in the case of deceleration processes, the fuel quantity metered in may be too high. In order to achieve good operating behavior and a fast response of the two stroke engine during acceleration and during deceleration, too, it can advantageously be provided that the control of the fuel valve deviates from the control on the basis of uninterruptedly successive blocks of successive revolutions of the crankshaft, in which the fuel valve is opened and closed exactly once, if an acceleration state or a deceleration state is identified.

If the control of the fuel valve deviates from the control on the basis of uninterruptedly successive blocks, in which the fuel valve is opened and closed exactly once, the fuel valve may be opened more frequently or less frequently than exactly once per block. Alternatively, provision may be made to vary the number of revolutions of the crankshaft per block. It is particularly preferably possible that, upon identification of an acceleration, the fuel valve is held open for longer in the present block if the fuel valve is still open upon the identification of an acceleration. If the fuel valve has already been closed, then the fuel valve may be opened again. Alternatively, the present block of revolutions of the crankshaft may be terminated, and a new block immediately started. In this way, the number of revolutions of the crankshaft for the block within which the acceleration was identified is lower. For the subsequent block, commenced immediately after identification of the acceleration, the number of revolutions of the crankshaft may assume the original value again, and the desired fuel quantity may be controlled through suitable selection of the closing time of the fuel valve. If a deceleration is identified, then the fuel valve may be held closed over one block of revolutions of the crankshaft. An increase of the number of revolutions of the crankshaft per block may also be provided for the deceleration situation.

Acceleration and deceleration are transient states in which the throttle element is adjusted by more than 10%, in particular more than 20%, preferably by more than 30% of the maximum adjustment of the throttle element over a crankshaft angle of 360°.

BRIEF DESCRIPTION OF THE DRAWINGS

The invention will now be described with reference to the drawings wherein.

DESCRIPTION OF THE PREFERRED EMBODIMENTS

Figure 1:
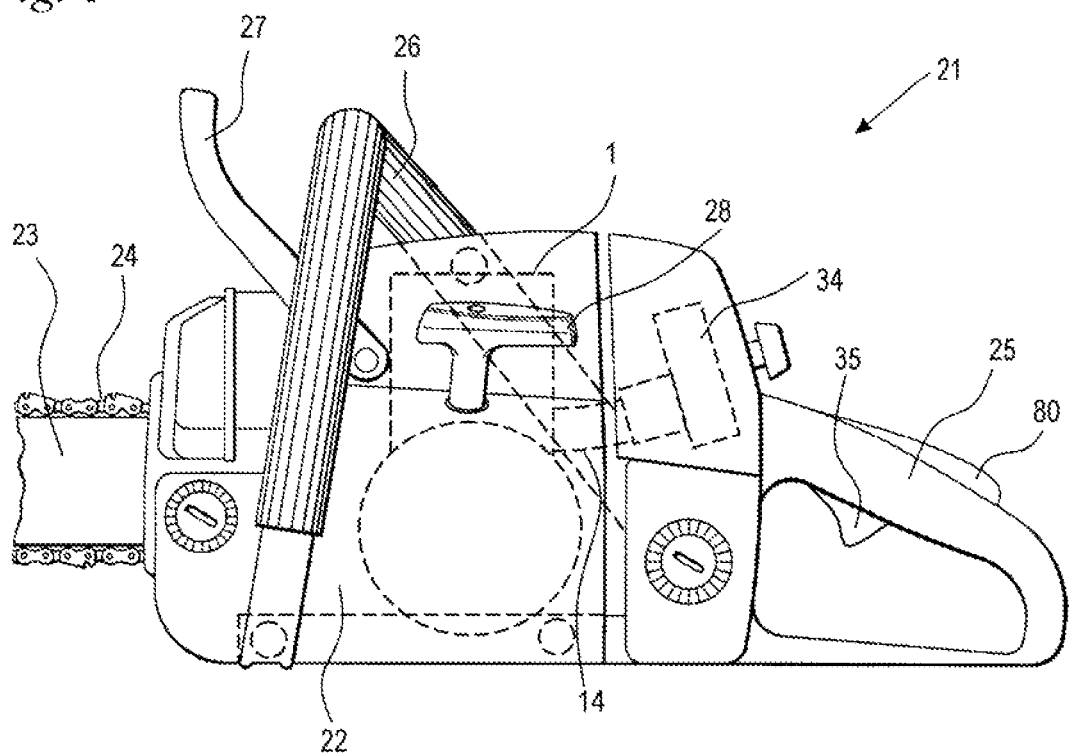
FIG. 1 is a schematic illustration of a chain saw with a two stroke engine.

FIG. 1 shows a chain saw 21 as an embodiment of a handheld work apparatus in which the method according to the disclosure for operating a two stroke engine can be used. The method according to the disclosure may also be used in other two stroke engines 1, in particular in two stroke engines in other work apparatuses, preferably handheld work apparatuses such as angle grinders, brushcutters, blowing apparatuses, harvesting apparatuses, lawnmowers or the like.

The chain saw 21 has a housing 22 which may be made up of several housing parts, and which need not be of closed form. A two stroke engine 1 is arranged in the housing 22. The two stroke engine 1 has an intake channel 14 via which air is drawn through an air filter 34 during operation. A rear handle 25 and a bale handle 26 are provided for the guidance of the chain saw 21 during operation. Fixed to the housing 22 is a guide bar 23 on which a saw chain 24 is arranged in encircling fashion. The saw chain 24 is driven by the two stroke engine 1. On that side of the bale handle 26 which faces toward the guide bar 23, there is arranged a hand protector 27 that can serve for the triggering of a chain brake (not illustrated). Operator control elements for the operator control of the two stroke engine 1 can advantageously be arranged on the rear handle 25. In the embodiment, a throttle lever 35 is arranged on the rear handle 25, via which throttle lever 35 the position of a throttle element 16 (FIG. 3), which is arranged in the intake channel 14 and which is not illustrated in FIG. 1, can be varied. Also arranged on the rear handle 25 is a throttle lever lock 80 which, in the non-actuated state, mechanically blocks the throttle lever 35.

Figure 2:
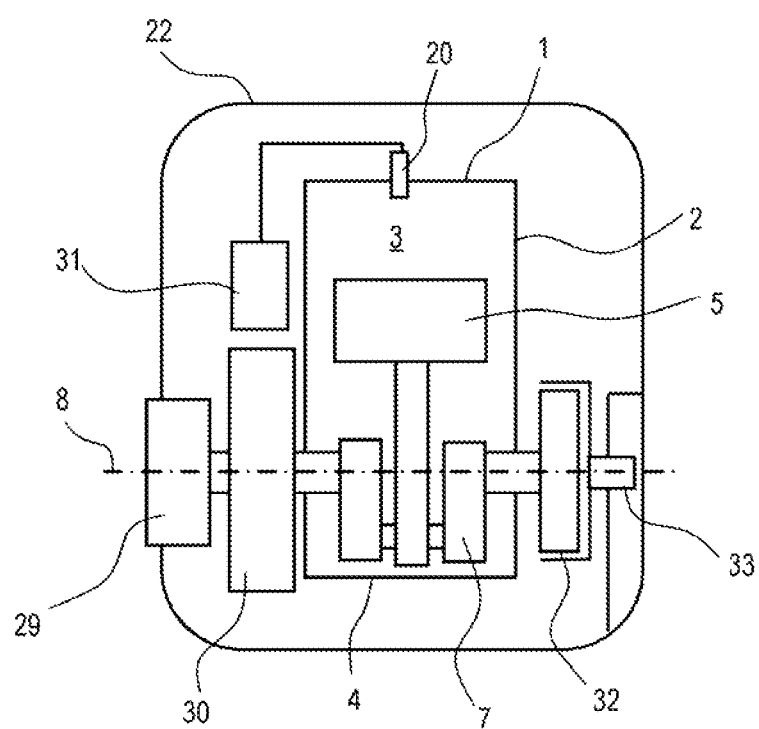
FIG. 2 is a schematic sectional illustration through the chain saw from FIG. 1.

FIG. 2 schematically shows the construction of the power unit of the chain saw 21. The two stroke engine 1 has a cylinder 2 in which a piston 5 is mounted so as to move in reciprocating fashion. The piston 5 delimits a combustion chamber 3. Projecting into the combustion chamber 3 is a spark plug 20 that is controlled by a control device 31. The piston 5 drives a crankshaft 7, which is mounted in a crankcase 4 so as to be rotatable about a rotational axis 8. In the embodiment, the crankshaft 7 bears a flywheel 30. The flywheel 30 may advantageously be in the form of a fan wheel that delivers cooling air to the cylinder 2. The control device 31 may include an ignition module in which a voltage is induced by magnets arranged on the flywheel 30. For this purpose, the control device 31 may advantageously be arranged on the outer circumference of the flywheel 30. Alternatively, the control device 31 may also be connected to a generator which is connected to the crankshaft 7 and which generates the energy for producing the ignition spark. Also arranged on the crankshaft 7 is a starting device 29 for the starting of the two stroke engine 1. In the embodiment, the starting device 29 is a pull starter and has the starter handle 28 schematically illustrated in FIG. 1. The pull starter may advantageously be used for manual starting by an operator. The starting device 29 may however also be an electrically driven starting device. In the embodiment, on that side of the crankcase 4 which is situated opposite the flywheel 30, a centrifugal clutch 32 is connected to the crankshaft 7. The output side of the centrifugal clutch 32 bears a drive pinion 33 which drives the saw chain 24. A clutch bell housing is schematically illustrated in FIG. 2 as an output side of the centrifugal clutch 32.

Figure 3:
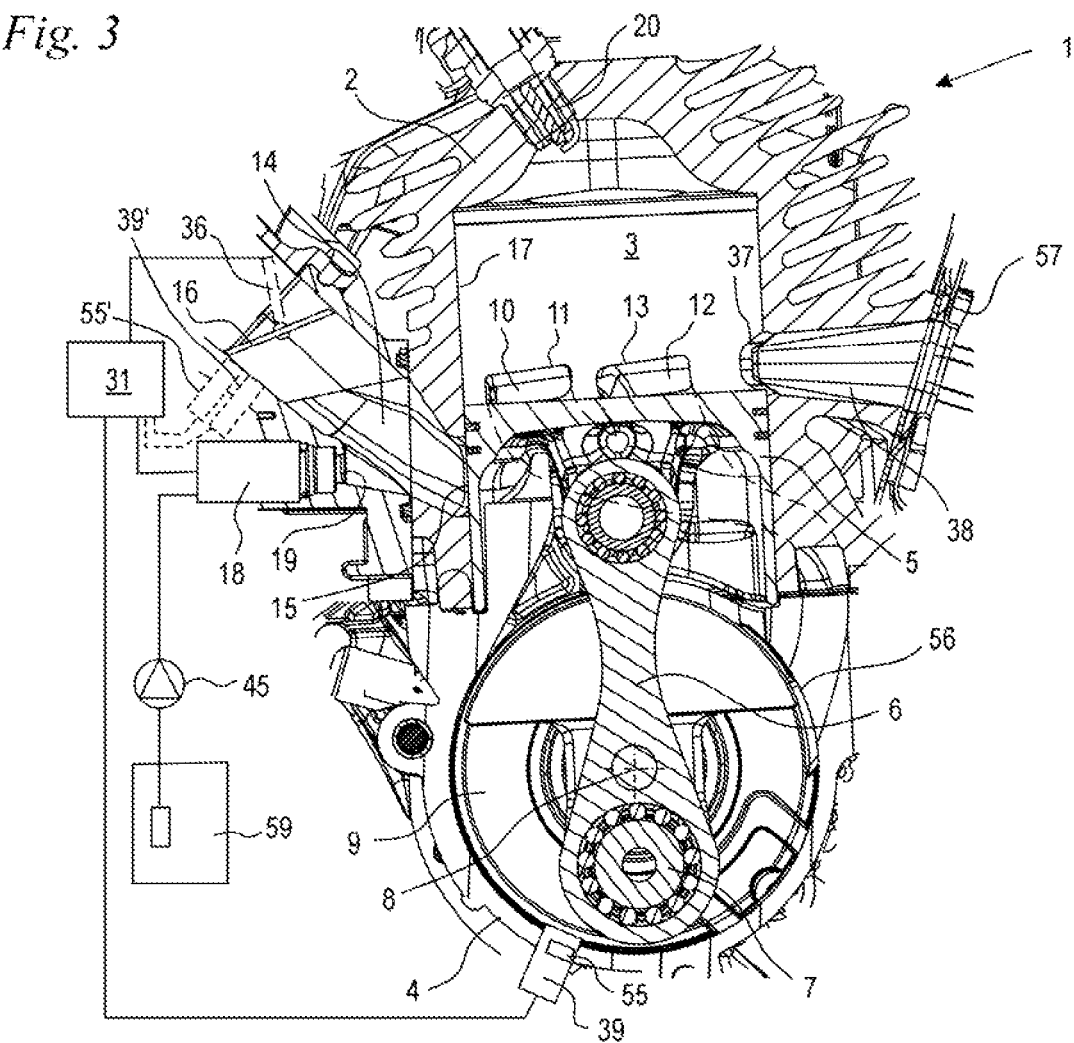
FIG. 3 is a schematic illustration of a section through the two stroke engine of the chain saw from FIG. 1.

FIG. 3 shows the construction of the two stroke engine 1 in detail. The piston 5 is mounted in a cylinder bore 17 so as to move in reciprocating fashion. The piston 5 rotationally drives the crankshaft 7 via a connecting rod 6. The intake channel 14 issues via an intake channel opening 15 on the cylinder bore 17. In the embodiment, the intake channel opening 15 is controlled by the piston 5 and opens and closes in a manner dependent on the position of the piston 5. In the region of the top dead center of the piston 5, the intake channel 14 is connected via the opened intake channel opening 15 to a crankcase interior 9. In the region of the bottom dead center of the piston 5, which is illustrated in FIG. 3, the crankcase interior 9 is fluidically connected via transfer channels 10 and 12 to the combustion chamber 3. Illustrated in the embodiment are a transfer channel 10 close to the inlet, which transfer channel 10 issues via a transfer window 11 into the combustion chamber 3, and a transfer channel 12 close to the outlet, which transfer channel 12 issues via a transfer window 13 into the combustion chamber. In the embodiment, two transfer channels 10 close to the inlet, which are arranged on opposite sides of the cylinder 2, and two mutually oppositely situated transfer channels 12 close to the outlet are combined to form one common transfer channel and issue into the crankcase interior 9 at a common outflow opening 56. Provision may however also be made for each transfer channel 10, 12 to issue into the crankcase interior 9 via a separate outflow opening 56.

A discharge opening 37 leads out of the combustion chamber 3, which discharge opening 37 is adjoined by a discharge channel 38. The discharge opening 37 is likewise controlled by the piston 5. The discharge channel 38 preferably issues into an exhaust muffler 57, of which only the region of the inlet opening for exhaust gases is illustrated in FIG. 3.

For the supply of fuel, the two stroke engine 1 in the embodiment according to FIG. 3 has a fuel valve 18. The fuel valve 18 is in the form of an electromagnetic valve. Fuel is fed to the fuel valve 18 from a fuel tank 59 by a fuel pump 45. The fuel pump 45 is in particular a membrane pump driven by the fluctuating pressure in the crankcase interior 9. The fuel valve 18 is controlled by the control device 31. Here, the fuel valve 18 may be a normally open valve or a normally closed valve. The fuel valve 18 has an outlet nozzle 19 via which the fuel metered by the fuel valve 18 emerges into the intake channel 14. The fuel valve 18 meters the entire fuel quantity that is supplied to the two stroke engine 1. It is preferable for no further fuel valves or fuel openings via which fuel is supplied to be provided.

In the intake channel 14, there is arranged a throttle element 16, in the embodiment a throttle flap. The position of the throttle element 16 is adjustable by the operator by way of the throttle lever 35 (FIG. 1). The operator can thus adjust the quantity of air that is supplied to the two stroke engine 1.

The control device 31 controls the fuel valve 18 on the basis of successive blocks of multiple successive revolutions of the crankshaft 7, as will be described in more detail below with regard to FIGS. 5 and 6. The control device 1 specifies the time at which the fuel valve 18 is closed for each block of multiple revolutions of the crankshaft 7. The time at which the fuel valve 18 is opened in each block of revolutions of the crankshaft may advantageously be fixedly specified in the control device 31. In an alternative configuration, provision may also be made for the opening time of the fuel valve 18 to be determined. The opening duration of the fuel valve 18 is determined by the control device 31 on the basis of parameters. These parameters can advantageously take into consideration boundary conditions, power unit conditions and/or ambient conditions. The control device 31 also takes into consideration the fact that the fuel valve 18 has a non-linear delivery characteristic, as will be described in more detail below with regard to FIG. 7.

One parameter that the control device 31 takes into consideration in determining the opening duration of the fuel valve 18 may be the position of the throttle element 16. A sensor 36 can advantageously be provided for detecting the position of the throttle element 16. The sensor 36 can advantageously be arranged outside the intake channel 14, that is, in front of or behind the image plane in FIG. 3, and is therefore illustrated using dashed lines. Alternatively or in addition, a pressure of the two stroke engine 1 can advantageously be detected. In the embodiment, a pressure sensor 39 is provided that detects the pressure in the crankcase interior 9. For this purpose, the pressure sensor 39 is arranged on the crankcase 4. Alternatively or in addition, a pressure sensor 39' may be provided which detects the pressure in the intake channel 14. For this purpose, the pressure sensor 39' that is schematically illustrated in FIG. 3 can advantageously be arranged on the intake channel 14. Alternatively or in addition, a temperature sensor 55 may be provided for detecting the temperature in the crankcase interior 9. Alternatively or in addition, the temperature of the inducted air in the intake channel 14 may be detected. A temperature sensor 55' is shown schematically in FIG. 3 for this purpose. Further and/or other parameters may also be used for determining the opening duration of the fuel valve 18.

Figure 4:
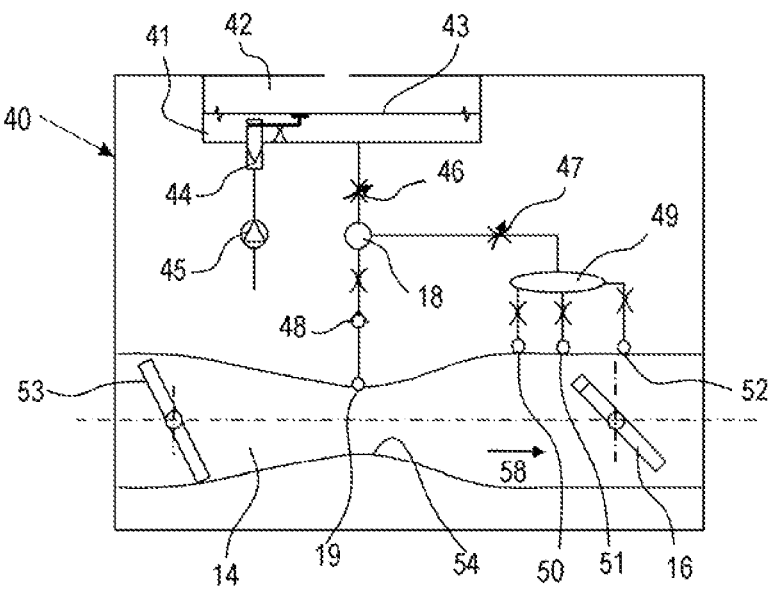
FIG. 4 is a schematic illustration of a carburetor that may alternatively be used for the supply of fuel to the two stroke engine from FIG. 3.

In the embodiment according to FIG. 3, the fuel valve 18 meters the fuel directly into the intake channel 14. Alternatively, the fuel valve 18 may be arranged in a carburetor 40, in which the fuel is drawn in owing to the negative pressure prevailing in the intake channel 14. Such a carburetor 40 is schematically illustrated in FIG. 4. The carburetor 40 has a fuel pump 45 for delivering fuel. The fuel pump 45 is preferably a membrane pump, which is in particular driven by the fluctuating pressure in the crankcase interior 9. The carburetor 40 includes a control chamber 41, which is separated via a control membrane 43 from a compensation chamber 42. Arranged at the inlet into the control chamber 41 is an inlet valve 44, which opens or closes in a manner dependent on the position of the control membrane 43. From the control chamber 41, fuel is fed via an adjustable throttle 46 to the electromagnetic fuel valve 18. From there, the fuel passes via a check valve 48 to the outlet opening 19. The outlet opening 19 issues into the intake channel 14 in the region of a venturi 54. The fuel metered by the electromagnetic fuel valve 18 is furthermore conducted via an adjustable throttle 47 to a fuel chamber 49 which, via fuel lines with fixed throttles, issues into the intake channel 14 at outlet nozzles 50, 51 and 52. In the embodiment, the outlet nozzle 50 is a part-load opening which issues into the intake channel 14 upstream of the throttle element 16 in relation to the flow direction 58 in the intake channel 14. The fuel nozzles 51 and 52 are idling operation fuel nozzles. When the throttle element 16 is open, air enters the fuel chamber 49 via the fuel nozzle 51, and the mixture formed here emerges into the intake channel 14 via the outlet nozzle 52.

In relation to the flow direction 58 in the intake channel 14, which is directed to the intake channel opening 15, a choke element 53 is arranged in the intake channel 14 upstream of the throttle element 16. Via the choke element 53, the negative pressure at the outlet nozzles 19 and 50 to 52 can be increased during the starting process in order to increase the fuel quantity supplied during the starting process.

It is also the case in the embodiment of the fuel supply via a carburetor 40, as illustrated in FIG. 4, that the entire fuel quantity supplied from the intake channel 14 is controlled by the electromagnetic fuel valve 18.

Figure 5:
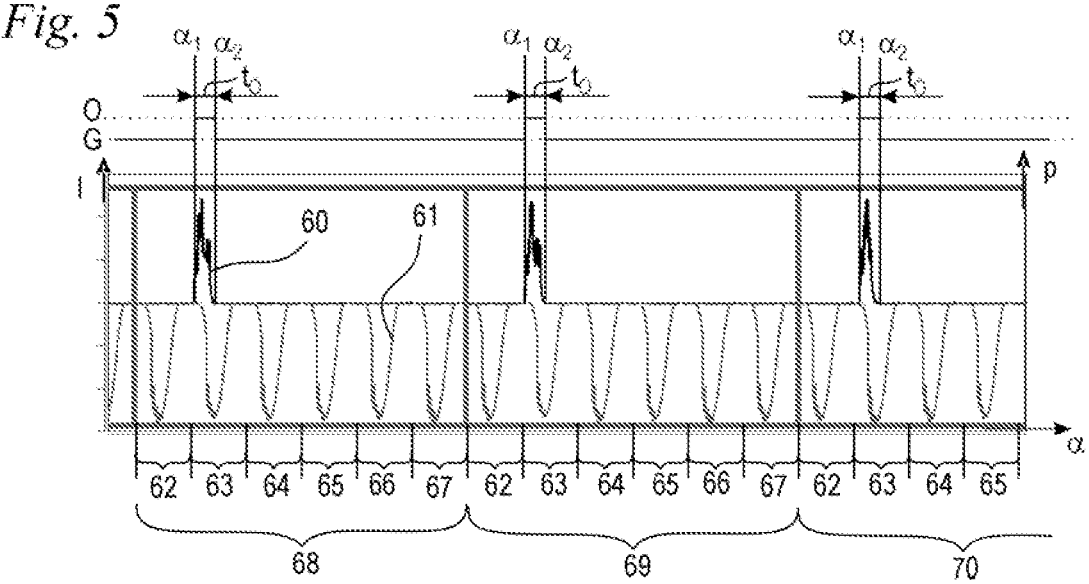
FIG. 5 is a schematic illustration of the electrical energization of the electromagnetic valve and of the pressure profile in the crankcase interior versus the crankshaft angle for idling operation.

FIG. 5 shows the control of the fuel valve 18 provided according to the disclosure, by way of a curve 60 that represents the electrical current I with which the fuel valve 18 is electrically energized versus the crankshaft angle α. The curve 61 shows the profile of the pressure p in the intake channel 14. With regard to the control of the fuel valve 18, multiple successive revolutions 62, 63, 64, 65, 66 and 67 of the crankshaft 7 are combined to form a block 68. A subsequent block 69 likewise includes revolutions 62 to 67 of the crankshaft 7. The same applies to a block 70 that follows the block 69, and to all further subsequent blocks. The number of revolutions of the crankshaft per block 68, 69, 70 is in this case equal for all blocks 68, 69, 70. The number of revolutions of the crankshaft 7 per block 68 to 70 is from 2 to 20 revolutions 62 to 67. It is advantageously the case that each block 68 to 70 includes from 3 to 12, in particular from 4 to 10, revolutions of the crankshaft 7. In the embodiment, 6 revolutions 62 to 67 of the crankshaft 7 are provided per block 68 to 70. 6 revolutions of the crankshaft 7 per block 68 to 70 is considered to be particularly preferred.

Each block 68 to 70 extends over a crankshaft angle α, which corresponds to the number of revolutions of the crankshaft 7 per block 68 to 70 multiplied by 360° crankshaft angle. All blocks 68, 69 and 70 are directly successive. Each block includes an integer number of revolutions of the crankshaft 7. Accordingly, each block 68 to 70 denotes a time interval that corresponds to an integer multiple of 360° crankshaft angle.

Figure 6:
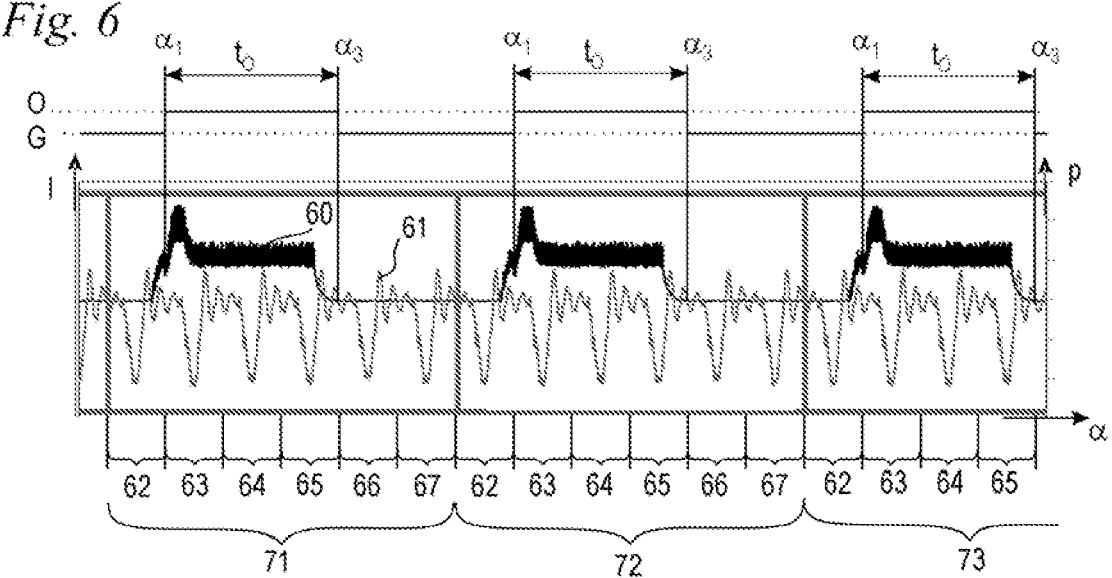
FIG. 6 is a schematic illustration corresponding to FIG. 5 for the rated rotational speed; and, FIG. 7 is a schematic illustration of the fuel quantity delivered through the electromagnetic valve over time.

The state of the fuel valve 18 is schematically denoted in FIG. 5 and FIG. 6 by the alphabetic characters "G" for closed and "O" for open. As shown in FIG. 5, owing to the inertia of the system, the opening and closing of the fuel valve 18 takes place with a slight time offset in relation to the commencement of the electrical energization. Within the first block 68, the fuel valve 18 opens at a crankshaft angle $α_1$. The fuel valve 18 closes at a subsequent crankshaft angle $α_2$. The fuel valve 18 as per FIG. 5 is a valve which is closed when electrically deenergized. In the case of a fuel valve 18 which is open when electrically deenergized, the electrical energization is performed in a correspondingly reversed manner. In the embodiment, the crankshaft angle $α_1$ closely precedes the opening of the intake channel opening 15, such that the fuel valve 18 is open when negative pressure builds up in the intake channel 14, as shown by the curve 61. The opening duration $t_ö$ that elapses from the crankshaft angle $α_1$ upon the opening until the crankshaft angle $α_2$ upon the closing of the fuel valve 18 is considerably less than 360°. Accordingly, in the case of the opening duration $t_ö$ for idling operation, as illustrated in FIG. 5, the fuel valve 18 is open for less than one revolution of the crankshaft 7. The opening of the fuel valve 18 advantageously refers to the time at which the fuel valve 18 has been fully opened, and the closing of the fuel valve 18 advantageously refers to the time at which the fuel valve 18 has been fully closed.

FIG. 6 shows corresponding curves 60 and 61 for another operating state, in the embodiment for the rated rotational speed, for example at full load. In each case 6 revolutions 62 to 67 of the crankshaft 7 form a block 71, 72, 73, wherein the blocks 71, 72, 73 are uninterruptedly successive. In each block, the fuel valve 18 is opened at the crankshaft angle $α_1$. The crankshaft angle $α_1$ is identical for idling operation (FIG. 5) and rated rotational speed (FIG. 6). The crankshaft angle $α_1$ at which the fuel valve 18 is opened is preferably identical at least for all quasi-steady operating states of the two stroke engine 1—optionally with the exception of the starting process and with the exception of transient states of the two stroke engine. For the starting process, the fuel valve 18 may be opened at the crankshaft angle $α_1$ or at a different crankshaft angle. If, upon identification of an acceleration demand, that is, a rapid opening of the throttle element, the present block is terminated and a new block is started, then the fuel valve 18 can, on the basis of this new block, be opened again at the same crankshaft angle $α_1$. The commencement of the electrical energization of the fuel valve 18 is, for all operating states, selected in a manner adapted to the desired opening time. The end of the electrical energization is, for all operating states, selected in a manner adapted to the desired closing time.

In the embodiment, at rated rotational speed, the fuel valve 18 is closed at a crankshaft angle $α_3$ that lies within the fourth revolution 65 of the crankshaft 7 within the block 71. As shown in FIG. 6, the opening duration $t_ö$ at rated rotational speed, for example at full load, is considerably greater than the opening duration $t_ö$ of the fuel valve 18 during idling operation. In the embodiment, at rated rotational speed, the opening duration $t_ö$ extends over more than three complete revolutions 63, 64, 65 of the crankshaft 7. A longer or shorter opening duration $t_ö$ may also be advantageous. As is also shown in FIG. 6, at rated rotational speed, considerable fluctuations in the pressure profile in the intake channel 14 arise even when the intake channel opening 15 is closed, that is, only a small negative pressure prevails in the intake channel 14.

The crankshaft angle $α_2$ or $α_3$ at which the fuel valve 18 is closed is determined by the control device 31 on the basis of parameters. The parameters may be the position of the throttle element 16, the pressure in the crankcase interior 9, a temperature of the two stroke engine 1, for example in the crankcase interior 9 or in the intake channel 14, or a component temperature of the two stroke engine 1, and/or the rotational speed of the two stroke engine 1. It is preferable for multiple parameters to be used for determining the closing time. The determination of the opening duration $t_ö$, in particular the determination of the crankshaft angle $α_2$ or $α_3$ at which the fuel valve 18 is closed, is preferably determined via a characteristic map that specifies one or more parameters versus the rotational speed of the two stroke engine 1. The characteristic map may for example specify the opening duration $t_ö$ versus the rotational speed and the throttle flap angle.

Figure 7:
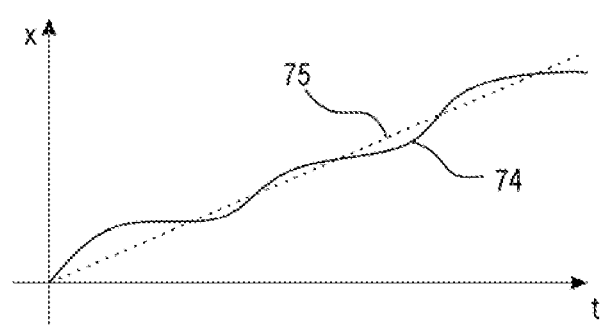

The delivery characteristic of the fuel valve 18 is non-linear. This is schematically illustrated in FIG. 7. Dashed lines are used to illustrate a curve 75 which, as a comparison curve, indicates a linear relationship between the supplied fuel quantity x and the time t. A curve 74 schematically represents the actual profile of the supplied fuel quantity x versus the time t. The curve 74 thus describes the delivery characteristic. As shown in FIG. 7, the curve 74 fluctuates. The fluctuations of the curve 74 arise firstly owing to the fluctuating pressure in the intake channel 14 and secondly from the inertia of the fuel column that must be moved during the supply of fuel. This results in a delayed commencement and a delayed end of the actual supply of fuel in relation to the opening time and closing time of the fuel valve 18. This non-linearity is taken into consideration in the determination of the crankshaft angle $\alpha_2$ or $\alpha_3$ at which the fuel valve 18 is closed. In this way, relatively exact metering of the fuel quantity to be supplied can be achieved even when using an electromagnetic fuel valve 18 of relatively simple construction.

By virtue of the fact that the crankshaft angle $\alpha_2$ or $\alpha_3$ at which the fuel valve 18 is closed is determined for each block 68 to 73 of revolutions 62 to 67 of the crankshaft 7, it is possible to react quickly to changed operating conditions, for example an acceleration demand of the operator, which is expressed by the opening of the throttle element 16. The operating conditions are in this case advantageously detected for each revolution 62 to 67 of the crankshaft 7. In the event that the fuel valve 18 is still open in the present block 68 to 73, the crankshaft angle $\alpha_2$ or $\alpha_3$ is particularly advantageously changed directly in a manner dependent on the changed operating conditions. If the fuel valve 18 has already been closed in the present block 68 to 73, the changed operating condition is advantageously taken into consideration for the subsequent block 68 to 73 of revolutions of the crankshaft 7. Provision may be made to terminate the present block 68 to 73 and immediately start a new block 68 to 73 with regard to the control of the fuel valve 18.

The fuel valve 18 is controlled after the starting process for at least one, in particular for all, quasi-steady states of the two stroke engine such that, on the basis of uninterruptedly successive blocks 68 to 73 of successive revolutions, the crankshaft is opened and closed exactly once within each block 68 to 73.

It is understood that the foregoing description is that of the preferred embodiments of the invention and that various changes and modifications may be made thereto without departing from the spirit and scope of the invention as defined in the appended claims.

What is claimed is:

1. A method for operating a two stroke engine, the two stroke engine having a cylinder, a piston, and a crankcase, a combustion chamber being formed in the cylinder, the combustion chamber being delimited by the piston which is mounted so as to move in reciprocating fashion in the cylinder, the piston being configured to rotationally drive a crankshaft that is mounted rotatably in the crankcase; the two stroke engine further having an electromagnetic fuel valve, a control device, an intake channel, and a throttle element arranged in the intake channel; the electromagnetic fuel valve being configured to control a fuel quantity (x) fed via at least one outlet nozzle into the intake channel; the control device being configured to control the fuel valve; and, wherein a quasi-steady state of the two stroke engine is a state in which the throttle element is adjusted by less than 10% of the maximum adjustment of the throttle element over a crankshaft angle ($\alpha$) of 360°, the method comprising:

controlling the fuel valve after a starting process in at least the quasi-steady state of the two stroke engine such that, on a basis of uninterruptedly successive blocks of successive revolutions of the crankshaft, the fuel valve is opened and closed exactly once within each block, each block including 2 to 20 revolutions of the crankshaft, and wherein the fuel valve is opened over a crankshaft angle ($\alpha$) of more than 360° within one block in at least one operating state.

2. The method of claim 1, wherein, within each block in the quasi-steady state, the fuel valve is opened at a same crankshaft angle ($\alpha_1$) within the corresponding block.

3. The method of claim 1, wherein the number of revolutions of the crankshaft per block in the quasi-steady state is stored as a constant value in the control device.

4. The method of claim 1 further comprising determining a desired opening duration ($t_ö$) of the fuel valve via the control device on a basis of at least one parameter.

5. The method of claim 4, wherein a non-linear delivery characteristic of the fuel into the intake channel is taken into consideration in the determining the desired opening duration ($t_ö$) of the fuel valve.

6. The method of claim 1 further comprising detecting a position of the throttle element via a sensor.

7. The method of claim 6 further comprising determining an opening duration ($t_ö$) of the fuel valve, wherein the detected position of the throttle element is a parameter for the determining of the opening duration ($t_ö$) of the fuel valve.

8. The method of claim 1, wherein a pressure sensor is provided, the method further comprising:
detecting a pressure in a crankcase interior of the crankcase or in the intake channel via the pressure sensor; and,
determining an opening duration ($t_ö$) of the fuel valve, wherein the detected pressure is a parameter for the determining of the opening duration ($t_ö$) of the fuel valve.

9. The method of claim 1, wherein a temperature sensor is provided, the method further comprising:
detecting a temperature via the sensor; and,
determining an opening duration ($t_ö$) of the fuel valve, wherein the detected temperature is a parameter for the determining of the opening duration ($t_ö$) of the fuel valve.

10. The method of claim 1 further comprising determining an opening duration ($t_ö$) of the fuel valve on a basis of a rotational speed of the two stroke engine.

11. The method of claim 1 further comprising determining an opening duration ($t_ö$) of the fuel valve via a characteristic map.

12. The method of claim 1, wherein, in the quasi-steady state, each block includes 3 to 12 revolutions of the crankshaft.

13. The method of claim 1, wherein, in the quasi-steady state, each block includes 4 to 10 revolutions of the crankshaft.

14. The method of claim 1, wherein, in the quasi-steady state, each block includes 6 revolutions of the crankshaft.

15. The method of claim 1, wherein, if an acceleration state or a deceleration state is identified, a control of the fuel valve deviates from said controlling on the basis of uninterruptedly successive blocks of successive revolutions of the crankshaft, in which the fuel valve is opened and closed exactly once.

* * * * *